(12) United States Patent
Long et al.

(10) Patent No.: US 11,045,999 B2
(45) Date of Patent: Jun. 29, 2021

(54) THROAT STRUCTURES FOR 3D PRINTERS, AND NOZZLE APPARATUS AND 3D PRINTERS HAVING THROAT STRUCTURES

(71) Applicant: SHANGHAI FUSION TECH CO., LTD., Shanghai (CN)

(72) Inventors: Wangping Long, Shanghai (CN); Hua Feng, Shanghai (CN); Jianzhe Li, Shanghai (CN)

(73) Assignee: Shanghai Fusion Tech Co., Ltd., Shanghai (CN)

( * ) Notice: Subject to any disclaimer, the term of this patent is extended or adjusted under 35 U.S.C. 154(b) by 234 days.

(21) Appl. No.: 16/285,613

(22) Filed: Feb. 26, 2019

(65) Prior Publication Data
US 2020/0215750 A1 Jul. 9, 2020

(30) Foreign Application Priority Data

Jan. 8, 2019 (CN) .......................... 201910016979.4
Jan. 8, 2019 (CN) .......................... 201920028351.1

(51) Int. Cl.
*B29C 64/209* (2017.01)
*B33Y 30/00* (2015.01)

(52) U.S. Cl.
CPC ............. *B29C 64/209* (2017.08); *B33Y 30/00* (2014.12)

(58) Field of Classification Search
CPC ..... B29C 64/20; B29C 64/205; B29C 64/209; B29C 64/214; B29C 64/218; B29C 64/223
See application file for complete search history.

(56) References Cited

U.S. PATENT DOCUMENTS

| 10,254,499 B1 * | 4/2019 | Cohen ...................... B23K 1/19 |
| 2012/0070523 A1 * | 3/2012 | Swanson ............. B29C 67/0085 |
| | | 425/96 |

(Continued)

FOREIGN PATENT DOCUMENTS

| CN | 205889893 U |   | 1/2017 |   |
| CN | 107953558 | * | 4/2018 | ........... B29C 64/118 |

(Continued)

OTHER PUBLICATIONS

Mattroberts, "Mattroberts' Hot End," Published May 6, 2011, retrieved online Dec. 11, 2020 <https://reprap.org/wiki/Mattroberts%27_Hot_End> (Year: 2011).*

(Continued)

*Primary Examiner* — Joseph S Del Sole
*Assistant Examiner* — Manley L Cummins, IV
(74) *Attorney, Agent, or Firm* — Avant Law Group, LLC

(57) ABSTRACT

A throat structure for a 3D printer according to an embodiment includes a cold zone for heat dissipation, a hot zone for heating, and a thermal insulation zone. The cold zone for heat dissipation has a titanium throat outer tube body and a teflon throat inner tube body, and the teflon throat inner tube body is socketed in the titanium throat outer tube body. The hot zone for heating has a heating block connection zone and a nozzle connection zone. The heating block connection zone is located on an external side of the hot zone for heating, and the nozzle connection zone is located at a lower part of the hot zone for heating. The thermal insulation zone is connected to the titanium throat outer tube body such that an area of the hot zone for heating is reduced and a printing material extrusion amount is controlled.

20 Claims, 3 Drawing Sheets

(56) References Cited

U.S. PATENT DOCUMENTS

| | | | | |
|---|---|---|---|---|
| 2014/0159284 A1* | 6/2014 | Leavitt | ............ | H05B 3/42 |
| | | | | 264/401 |
| 2014/0263534 A1* | 9/2014 | Post | ............ | B29C 64/227 |
| | | | | 226/196.1 |
| 2015/0165676 A1* | 6/2015 | Chen | ............ | B29C 64/118 |
| | | | | 425/170 |
| 2017/0057168 A1* | 3/2017 | Miller | ............ | B29C 64/209 |
| 2017/0190116 A1* | 7/2017 | Grosche | ............ | B29C 48/865 |
| 2018/0154580 A1* | 6/2018 | Mark | ............ | B29C 64/35 |
| 2018/0169941 A1* | 6/2018 | Taniguchi | ............ | B41J 2/17 |
| 2018/0326743 A1* | 11/2018 | Lee | ............ | B41J 2/3354 |
| 2019/0160744 A1* | 5/2019 | Besim | ............ | B33Y 30/00 |
| 2020/0016823 A1* | 1/2020 | Hymas | ............ | B29C 64/314 |

FOREIGN PATENT DOCUMENTS

| | | |
|---|---|---|
| CN | 109514860 A | 3/2019 |
| CN | 109849331 A | 6/2019 |

OTHER PUBLICATIONS

Jazzymt, "Watson Hot End," published Mar. 26, 2012, retrieved online Dec. 11, 2020, <https://www.reprap.org/wiki/Watson_Hot_End > (Year: 2012).*

\* cited by examiner

THROAT STRUCTURES FOR 3D PRINTERS, AND NOZZLE APPARATUS AND 3D PRINTERS HAVING THROAT STRUCTURES

RELATED APPLICATIONS

This application claims priority to Chinese Application No. 201920028351.1 filed Jan. 8, 2019 and to Chinese Application No. 201910016979.4 filed Jan. 8, 2019. The disclosure of each is incorporated herein in its entirety by reference.

FIELD OF THE DISCLOSURE

The disclosure relates generally to the field of 3D printing. More specifically, the disclosure relates to throat structures for 3D printers and to nozzle apparatus and 3D printers having throat structures.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a throat structure for a 3D printer includes a cold zone for heat dissipation, a hot zone for heating, and a thermal insulation zone. The cold zone for heat dissipation has a titanium throat outer tube body and a teflon throat inner tube body, and the teflon throat inner tube body is socketed in the titanium throat outer tube body. The hot zone for heating has a heating block connection zone and a nozzle connection zone. The heating block connection zone is located on an external side of the hot zone for heating, and the nozzle connection zone is located at a lower part of the hot zone for heating. The thermal insulation zone is connected to the titanium throat outer tube body such that an area of the hot zone for heating is reduced and a printing material extrusion amount is controlled.

According to another embodiment, a throat structure for a 3D printer includes a cold zone for heat dissipation, a hot zone for heating, and a thermal insulation zone. The cold zone for heat dissipation has a throat outer tube body and a throat inner tube body, and the throat inner tube body is socketed in the throat outer tube body. The hot zone for heating has a heating block connection zone and a nozzle connection zone. The heating block connection zone is located on an external side of the hot zone for heating, and the nozzle connection zone is located at a lower part of the hot zone for heating. The thermal insulation zone is connected to the throat outer tube body such that an area of the hot zone for heating is reduced and a printing material extrusion amount is controlled. At least part of the throat outer tube body is constructed of a first material and at least part of the throat inner tube body is constructed of a second material, with the second material being different from the first material.

According to still another embodiment, a 3D printer nozzle includes a throat structure, a radiator, a heating block, and a nozzle. The throat structure includes a cold zone for heat dissipation, a hot zone for heating, and a thermal insulation zone. The cold zone for heat dissipation has a throat outer tube body and a throat inner tube body, and the throat inner tube body is socketed in the throat outer tube body. The hot zone for heating has a heating block connection zone and a nozzle connection zone. The heating block connection zone is located on an external side of the hot zone for heating, and the nozzle connection zone is located at a lower part of the hot zone for heating. The thermal insulation zone is connected to the throat outer tube body such that an area of the hot zone for heating is reduced and a printing material extrusion amount is controlled. At least part of the throat outer tube body is constructed of a first material and at least part of the throat inner tube body is constructed of a second material, with the second material being different from the first material. The radiator is mounted in the cold zone for heat dissipation. The heating block is mounted in the hot zone for heating. The nozzle is mounted in the nozzle connection zone.

Figure 1:
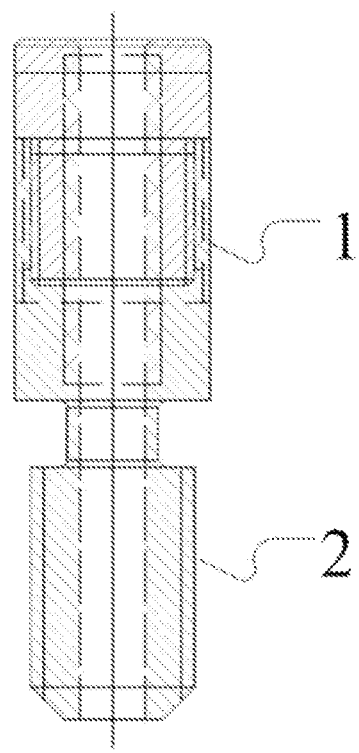
FIG. 1 is a sectional schematic diagram of a throat structure for a 3D printer according to an embodiment of the current disclosure.

Terms used herein for indicating orientations or positional relationships, such as "upper," "lower," "top," and "middle" are based on orientations or positional relationships shown in the drawings. Without more, or as would be inherent from the disclosure, these terms do not require the associated member to have a particular orientation.

DETAILED DESCRIPTION

By combining titanium and teflon and providing a thermal insulation zone, embodiments disclosed herein may be applied to hot ends of 3D printers to help 3D printers control discharge precision, and may prevent plugging during printing or returning of a material in printing, thereby improving the 3D printing quality.

Figure 2:
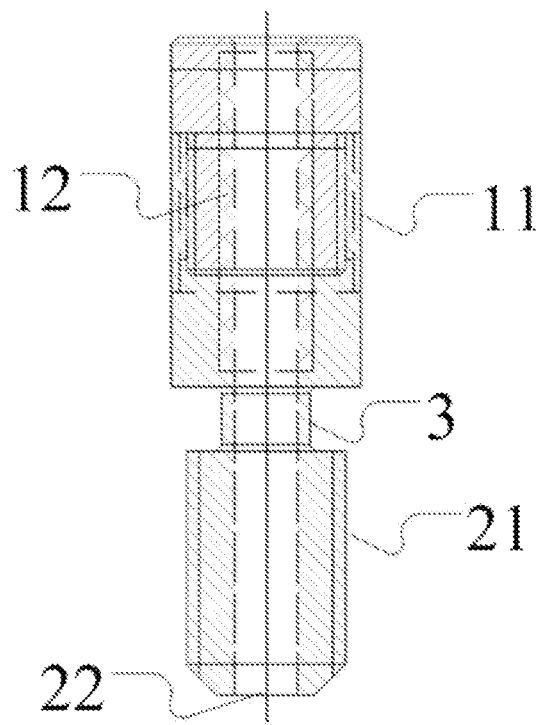
FIG. 2 is a sectional schematic diagram of a throat structure for a 3D printer according to another embodiment.
Figure 3:
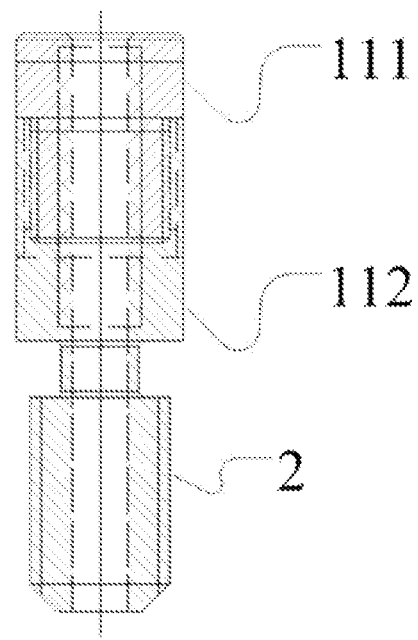
FIG. 3 is a sectional schematic diagram of a throat structure for a 3D printer according to still another embodiment.

As shown in FIG. 1 to FIG. 3, a throat structure for a 3D printer in an embodiment of this application comprises a cold zone 1 for heat dissipation and a hot zone 2 for heating. The cold zone 1 for heat dissipation comprises a titanium throat outer tube body 11 and a teflon throat inner tube body 12. The teflon throat inner tube body 12 is socketed in the titanium throat outer tube body 11. The hot zone 2 for heating comprises a heating block connection zone 21 and a nozzle connection zone 22. The heating block connection zone 21 is located on an external side of the hot zone 2 for heating, and the nozzle connection zone 22 is located at a lower part of the hot zone 2 for heating. The throat structure further comprises a thermal insulation zone 3 connected to the titanium throat outer tube body 11, so that the area of the hot zone 2 for heating in the throat structure is reduced and a printing material extrusion amount is controlled. This embodiment of the present disclosure provides a throat at a hot end of a 3D printer. In the titanium throat outer tube body 11, by using a feature of a low thermal conductivity coefficient of the titanium material, printing supplies can be softened by efficiently using heat. The teflon throat inner tube body 12 is socketed in the titanium throat outer tube body 11. The teflon material is heat-resisting, smooth, and non-adhesive, so that the softened material is not bonded with an inner wall of the throat structure, thereby effectively preventing plugging. The thermal insulation zone 3 uses a principle of sudden section change. The thermal insulation zone is formed between the heat dissipation zone and the hot zone for heating, so that the hot zone of the material is minimized, and the extrusion amount is controlled more precisely. By means of the thermal insulation design between the hot zone 2 for heating and the cold zone 1 for heat dissipation, and by using different materials in the cold zone 1 for heat dissipation and the hot zone 2 for heating, different functions that the throat structure should use in the cold zone 1 for heat dissipation and the hot zone 2 for heating can be brought into full play, thereby reducing impact on the feeding and improving the discharge precision and printing success rate.

Specifically, a titanium material is used at an upper end of the titanium throat outer tube body 11, and the titanium material may also be used at a lower end of the titanium throat outer tube body 11. An insert teflon material is used in the middle of the titanium throat outer tube body 11. In the aluminum heating block connection zone, the titanium throat lower end, and a region where the outer diameter is suddenly reduced, the hot zone for heating and the cold zone for heat dissipation can be partitioned quickly.

It should be noted that implementations such as changing the shape of the throat structure for a 3D printer, selecting materials with different heat dissipation effects, or changing an assembly manner are not specifically limited in this embodiment. A person skilled in the art can select a different size or shape, select materials with a uniform heat dissipation effect, or change an assembly manner according to actual usage conditions.

In the throat structures disclosed herein for 3D printers (and in nozzle apparatus and 3D printers having such throat structures), a cold zone for heat dissipation and a hot zone for heating are separated. In some embodiments, the cold zone for heat dissipation comprises a titanium throat outer tube body and a teflon throat inner tube body. The teflon throat inner tube body is socketed in the titanium throat outer tube body. The hot zone for heating comprises a heating block connection zone and a nozzle connection zone. The heating block connection zone is located on an external side of the hot zone for heating, and the nozzle connection zone is located at a lower part of the hot zone for heating. The throat structure further comprises a thermal insulation zone connected to the titanium throat outer tube body, so that the area of the hot zone for heating in the throat structure is reduced and a printing material extrusion amount is controlled. Therefore, embodiments may achieve technical effects of effectively controlling feeding, controlling printing precision, and improving a printing success rate, thereby improving printing.

As shown in FIG. 3, the titanium throat outer tube body 11 may include a titanium throat upper end 111 and a titanium throat lower end 112. The titanium throat upper end 111 and the titanium throat lower end 112 are detachably screwed, so that the teflon throat inner tube body 12 is located inside the titanium throat outer tube body 1 as an insert. Specifically, in a mounting process, the titanium throat upper end 111 and the titanium throat lower end 112 are connected (e.g., through threads), and the teflon throat is inserted in the interior, so that features of the teflon material (i.e., being high-temperature resisting, smooth, and non-adhesive) are utilized in a cold zone at a hot end.

According to some embodiments of the disclosure, it may be desirable for the teflon throat inner tube body 12 to be a teflon-sprayed tube body or a teflon-solid tube body. After molten at a high temperature, the material becomes thick and is easily adhered on the inner wall of the throat. The thick material may flush back during printing returning, causing plugging and a printing failure. Features of the teflon material (i.e., being high-temperature resisting, smooth, and non-adhesive) may desirably be utilized in the throat structures. In alternative embodiments, a ceramic material with similar physical properties (i.e., high-temperature resisting, smooth, and non-adhesive) may also be used to substitute the teflon material.

According to embodiments of the disclosure, it may be desirable for the thermal insulation zone 3 to be a region with a reduced outer diameter at a joint between the heating block connection zone and the titanium throat outer tube body, so that the hot zone for heating is partitioned from the cold zone for heat dissipation. Specifically, the thermal insulation zone 3 is provided at the titanium throat lower end 112 through processing, so that the hot zone for heating is insulated from the cold zone for heat dissipation, thereby transferring high temperature quickly.

According to embodiments of the disclosure, it may be desirable for a titanium material with a low thermal conductivity coefficient to be selected for the titanium throat outer tube body. Specifically, the throat may be processed by using a titanium alloy and the teflon material. By using the structural physical principle, the thermal insulation zone is provided and a contact area is increased, thus greatly ensuring the stability of the whole apparatus.

According to embodiments of the disclosure, it may be desirable for a stainless-steel material with a low thermal conductivity coefficient to be selected for the throat outer tube body. Specifically, the throat may be processed by using a stainless-steel material and the teflon material.

Figure 4:
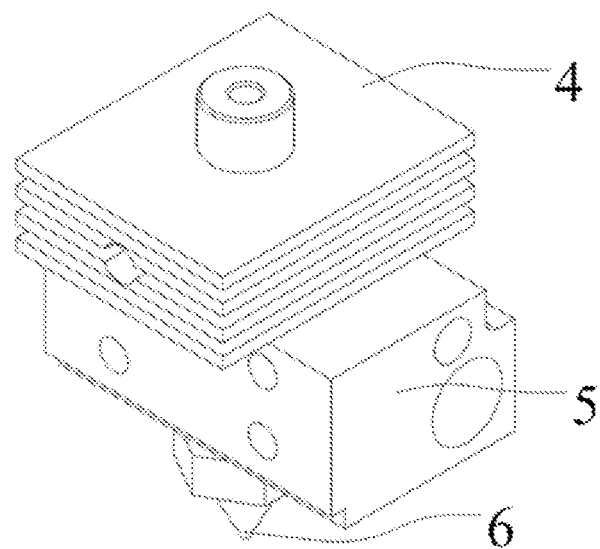
FIG. 4 is a three-dimensional schematic diagram of a nozzle apparatus according to an embodiment of the current disclosure.
Figure 5:
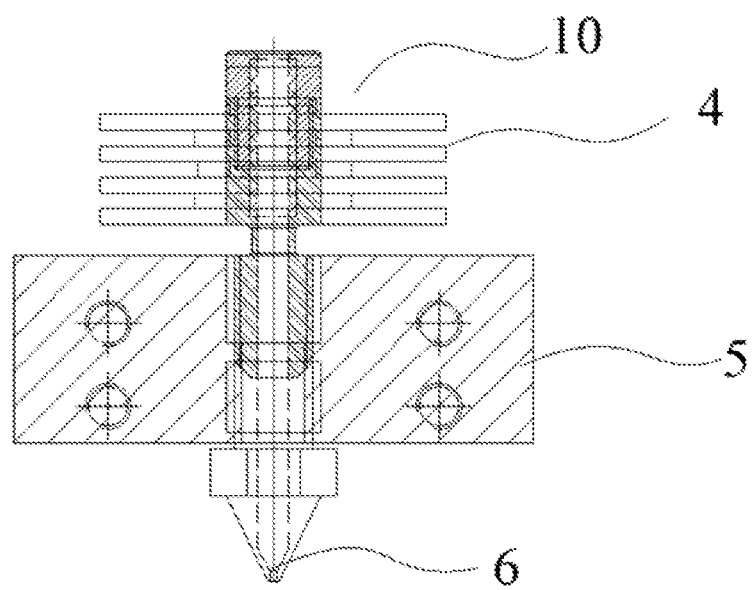
FIG. 5 is a sectional schematic diagram of a nozzle apparatus according to an embodiment of the current disclosure.

According to embodiments of the disclosure, nozzle apparatus for implementing the foregoing throat structure for a 3D printer are further provided. As shown in FIG. 4 and FIG. 5, one such apparatus comprises the throat structure, and further comprises a radiator 4, a heating block 5, and a nozzle 6. The radiator 4 is mounted in the cold zone 1 for heat dissipation, the heating block 5 is mounted in the hot zone 2 for heating, and the nozzle 6 is mounted in the nozzle connection zone 22. It may be desirable for the radiator 4 to be an aluminum block radiator, for the heating block to be an aluminum heating block, and for the nozzle 6 to be a copper nozzle.

And it may be desirable for the heating block 5 to be detachably connected to the heating block connection zone 21 (e.g., through a thread structure).

For example, a titanium material may be used at an upper end of the titanium throat outer tube body 11, the titanium material may also be used at a lower end of the titanium throat outer tube body 11, and an insert teflon material may be used in the middle of the titanium throat outer tube body 11. In the aluminum heating block connection zone, the titanium throat lower end, and a region where the outer diameter is suddenly reduced, the hot zone for heating and the cold zone for heat dissipation can be partitioned quickly.

As shown in FIG. 4 and FIG. 5, the throat structure 10 may be connected to the heating block 5 through the heating block connection zone 21. The nozzle 6 may be connected to the heating block 5 through threads or another appropriate fastener. The throat structure 10 is in contact with, positioned with, and flatly adhered to a conical surface of the nozzle 6 through the nozzle connection zone 22. The radiator 4 and the throat structure 10 are connected in a fitting manner and are secured (e.g., by using screws). Through the thermal insulation zone 3, the heating block 5 and the nozzle 6 are formed as a hot zone for high-temperature heating, and the radiator 4 is formed as a cold zone for heat dissipation.

By connecting the titanium throat lower end 112 and the heating block 5 (e.g., through threads), a contact area can be increased, and heat can be used efficiently—thus, feeding may be accurate and high printing precision may be achieved. In the throat structure 10, the titanium throat upper end 111 is connected to the titanium throat lower end 112 (e.g., through threads) and the teflon throat inner tube body 12 is fixed inside the throat structure 10, thereby forming the cold zone for heat dissipation and the hot zone for heating, so that the hot zone is minimized, the heat is used efficiently, and the printing precision and quality stability are ensured.

As would understood by a person of ordinary skill in the art, a teflon material in this application is a polytetrafluoroethylene (PTFE) material. In alternative embodiments, the teflon material may be a reinforced PTFE material such as glass filled PTFE, porous PTFE, anti-static PTFE, carbon fiber-filled PTFE, graphite-filled PTFE, bronze-filled PTFE, glass-moly-filled PTFE, glass-filled PTFE, molybdenum disulfide-filed PTFE, mineral-filled PTFE, polyimide-filled PTFE, or stainless-steel filled PTFE. The PTFE materials with different types of filler materials may have different mechanical and physically properties. And the reinforced PTFE materials may have similar or different heat-resisting, smooth, and non-adhesive properties compared with the PTFE materials without fillers.

In other embodiments of the disclosure, 3D printers (e.g., desktop 3D printers) are provided that include the throat structure or the nozzle apparatus. Because the 3D printers have the foregoing throat structure or the nozzle apparatus, they may also achieve the same beneficial effects. When applied to a hot end of a 3D printer, the foregoing throat structure or the nozzle apparatus may desirably help the 3D printer control discharge precision and prevent plugging during printing or returning of a material in printing, thereby improving the 3D printing quality.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims.

The invention claimed is:

1. A throat structure for a 3D printer, comprising:
   a cold zone for heat dissipation, the cold zone for heat dissipation having a titanium throat outer tube body and a PTFE throat inner tube body, the PTFE throat inner tube body being socketed in the titanium throat outer tube body;
   a hot zone for heating, the hot zone for heating having a heating block connection zone and a nozzle connection zone, the heating block connection zone being located on an external side of the hot zone for heating, the nozzle connection zone being located at a lower part of the hot zone for heating; and
   a thermal insulation zone connected to the titanium throat outer tube body such that an area of the hot zone for heating is reduced;
   wherein:
   the titanium throat outer tube body has a titanium throat upper part and a titanium throat lower part; and
   the titanium throat upper part and the titanium throat lower part are detachably coupled to each other such that the PTFE throat inner tube body is fully socketed from above by the titanium throat upper part and from below by the titanium throat lower part.

2. The throat structure of claim 1, wherein the titanium throat upper part and the titanium throat lower part are detachably threaded to each other.

3. The throat structure of claim 1, wherein the PTFE throat inner tube body is a PTFE-sprayed tube body or a PTFE-solid tube body.

4. The throat structure of claim 1, wherein the thermal insulation zone is a region with a reduced outer diameter at a joint between the heating block connection zone and the titanium throat outer tube body such that the hot zone for heating is partitioned from the cold zone for heat dissipation.

5. The throat structure of claim 1, wherein a titanium material is selected for the titanium throat outer tube body.

6. The throat structure of claim 1, wherein the throat structure is in contact with and flatly adhered to a conical surface of a nozzle through the nozzle connection zone.

7. A throat structure for a 3D printer, comprising:
   a cold zone for heat dissipation, the cold zone for heat dissipation having a throat outer tube body and a throat inner tube body, the throat inner tube body being socketed in the throat outer tube body;
   a hot zone for heating, the hot zone for heating having a heating block connection zone and a nozzle connection zone, the heating block connection zone being located on an external side of the hot zone for heating, the nozzle connection zone being located at a lower part of the hot zone for heating; and
   a thermal insulation zone connected to the throat outer tube body such that an area of the hot zone for heating is reduced;
   wherein:
   at least part of the throat outer tube body is constructed of a first material and at least part of the throat inner tube body is constructed of a second material, the second material being different from the first material;
   the throat outer tube body has a throat upper part and a throat lower part; and
   the throat upper part and the throat lower part are detachably coupled to each other such that the throat inner tube body is fully socketed from above by the throat upper part and from below by the throat lower part.

8. The throat structure of claim 7, wherein the thermal insulation zone is a region with a reduced outer diameter at a joint between the heating block connection zone and the throat outer tube body such that the hot zone for heating is partitioned from the cold zone for heat dissipation.

9. The throat structure of claim 7, wherein the throat outer tube body is made of a stainless-steel material.

10. The throat structure of claim 7, wherein the throat inner tube body is made of a reinforced PTFE material selected from the group consisting of glass filled PTFE, porous PTFE, anti-static PTFE, carbon fiber-filled PTFE, graphite-filled PTFE, bronze-filled PTFE, glass-moly-filled PTFE, glass-filled PTFE, molybdenum disulfide-filed PTFE, mineral-filled PTFE, polyimide-filled PTFE, and stainless-steel filled PTFE.

11. The throat structure of claim 7, wherein the throat inner tube body is made of a heat-resisting ceramic material.

12. The throat structure of claim 7, wherein the throat structure is in contact with and flatly adhered to a conical surface of a nozzle through the nozzle connection zone.

13. A 3D printer nozzle, comprising:
  a throat structure, comprising:
    a cold zone for heat dissipation, the cold zone for heat dissipation having a throat outer tube body and a throat inner tube body, the throat inner tube body being socketed in the throat outer tube body;
    a hot zone for heating, the hot zone for heating having a heating block connection zone and a nozzle connection zone, the heating block connection zone being located on an external side of the hot zone for heating, the nozzle connection zone being located at a lower part of the hot zone for heating; and
    a thermal insulation zone connected to the throat outer tube body such that an area of the hot zone for heating is reduced and a;
  wherein:
    at least part of the throat outer tube body is constructed of a first material and at least part of the throat inner tube body is constructed of a second material, the second material being different from the first material;
    the throat outer tube body has a throat upper part and a throat lower part; and
    the throat upper part and the throat lower part are detachably coupled to each other such that the throat inner tube body is fully socketed from above by the throat upper part and from below by the throat lower part;
  a radiator mounted in the cold zone for heat dissipation;
  a heating block mounted in the hot zone for heating; and
  a nozzle mounted in the nozzle connection zone.

14. The 3D printer nozzle of claim 13, wherein:
  the radiator is an aluminum block radiator;
  the heating block is an aluminum heating block;
  the nozzle is a copper nozzle;
  the throat outer tube body is constructed of titanium; and
  the throat inner tube body is constructed of PTFE.

15. The 3D printer nozzle of claim 14, wherein the heating block is detachably connected to the heating block connection zone by threading.

16. The 3D printer nozzle of claim 13, wherein the throat upper part and the throat lower part are detachably threaded to each other.

17. The 3D printer nozzle of claim 13, wherein the thermal insulation zone is a region with a reduced outer diameter at a joint between the heating block connection zone and the throat outer tube body such that the hot zone for heating is partitioned from the cold zone for heat dissipation.

18. The 3D printer nozzle of claim 13, wherein:
  the throat outer tube body is constructed of titanium; and
  the throat inner tube body is constructed of PTFE.

19. The 3D printer nozzle of claim 18, wherein the thermal insulation zone is a region with a reduced outer diameter at a joint between the heating block connection zone and the throat outer tube body such that the hot zone for heating is partitioned from the cold zone for heat dissipation.

20. The throat structure of claim 13, wherein the throat structure is in contact with and flatly adhered to a conical surface of the nozzle through the nozzle connection zone.

* * * * *